United States Patent [19]

Wood

[11] 4,439,469

[45] Mar. 27, 1984

[54] FORMATION OF A LINING IN PIPELINES

[75] Inventor: Eric Wood, Northants, England

[73] Assignee: Insituform International N.V., Curacao, Netherlands Antilles

[21] Appl. No.: 354,756

[22] Filed: Mar. 4, 1982

[30] Foreign Application Priority Data

Mar. 5, 1981 [GB] United Kingdom ............ 816942

[51] Int. Cl.³ ............... B05D 7/22; B05D 1/28; B05D 1/02; B05D 1/36
[52] U.S. Cl. ............................ 427/230; 427/235; 427/236; 427/239
[58] Field of Search ............ 427/230, 235, 236, 239

[56] References Cited

U.S. PATENT DOCUMENTS 3,312,669 4/1967 Giordano ............ 427/302 X

Primary Examiner—James R. Hoffman
Attorney, Agent, or Firm—Fred Philpitt

[57] ABSTRACT

A method of forming a lining in a pipeline comprising forming on the inner surface of the pipeline a film of initiator and following the formation of this film of initiator, a layer of resin is formed on the film of the initiator for effecting accelerated cure of the resin thereby to form a cured lining in the pipeline inner surface.

7 Claims, 6 Drawing Figures

FORMATION OF A LINING IN PIPELINES

This invention relates to the formation of linings in pipelines, and the expression "pipelines" as used herein is intended to mean pipes and passageways, whether underground or above ground, although the invention will have special application to the formation of lining underground pipes.

In many instances it is desirable to provide a lining on the inside of a pipe in order, for example, to repair cracks and fractures in the pipe, to render it fluid impermeable, or to change the usage of the pipe i.e. to make it suitable for carrying a medium which it is not otherwise suitable for. There are of course many known systems for the lining of pipelines, and these include the placement of a rigid lining tube inside the pipeline, the sticking of plastic tubular films to the inside of pipelines, the shaping of resin impregnated felts in tubular form to the pipeline, and various other processes.

The present invention is not intended necessarily to be an alternative to all of the processes indicated above, but rather is a method which will have its own specific application, where the other processes are not suitable.

The basis of the present invention comprises the utilisation of a two-part resin system, comprising the resin base and an initiator medium, both of which are fluent materials and which when combined result in the formation of a mixture which cures or sets quicker than the resin part otherwise would without the presence of the initiator. The initiator, depending on the nature of the resin, might appropriately be called a hardener, an accelerator, or a catalyst, but in any case its function is to make the mixture cure significantly quicker than would the basic resin. Indeed some resins will never cure unless they are mixed with an initiator.

Two-part resin systems are of course well known and are used in many applications, and it is also well known as to the initiators which are used with the particular resin, and therefore no specific detail concerning the respective resins and hardeners is given herein, other than to indicate a suitable two-part system which has been used successfully in the present invention. It is of significance however, to mention that traditionally the parts of the resin are thoroughly mixed before being used, which, as will become clear hereinafter, is in sharp distinction with the present invention.

Also, it is well known to persons skilled in the art concerning the utilisation of two-part resin systems as to the quantities of initiator and resin which are used in providing the curable mixture, and whilst the following is not intended to be limiting as to the scope of the present invention, typically the proportions may be a 5% initiator and 95% resin, the percentages being by volume.

In the process of the present invention there is formed on the inner surface of the pipeline a film of the initiator and following the formation of this film of initiator a layer of the resin is formed on the film of initiator for effecting accelerated cure of the resin thereby to form a cured lining in the pipeline inner surface.

The film of initiator and layer of resin may be formed in a number of different ways.

For example, it is possible to fill the pipeline with initiator and then to remove the excess so as to leave only the said film on the pipeline inner surface. In an alternative arrangement, the pipeline inner surface can have the film formed thereon by means of pulling a centrifugal sprayer through the pipeline, the sprayer spraying the initiator on to the pipeline surface. In yet a further method, the initiator can be applied by everting a carrier tube into the pipeline so that the inside of the carrier tube which, after eversion becomes the outer surface of the tube when in the pipeline, carries the initiator and thereby the initiator is applied to the pipeline surface.

The layer of resin may be applied in any suitable manner, for example as any of the methods indicated above.

The invention also contemplates a repeating of the process so as to form successive layers of initiator and resin in alternating arrangement so as to build up the thickness of the lining, and also so as to provide more effective curing of the resin layer.

The invention in embodiments thereof will now be described with reference to the accompanying drawings, wherein.

Figure 1:
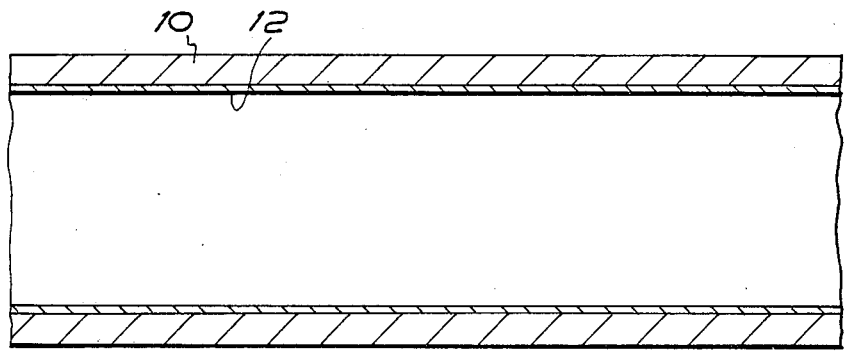
FIG. 1 shows a section of pipeline with the initiator applied thereto.

Referring to FIG. 1, this figure shows a section of pipeline 10 to which has been applied a film 12 of initiator. This initiator may be an acetone based initiator, for use with an acrylic resin.

Figure 2:
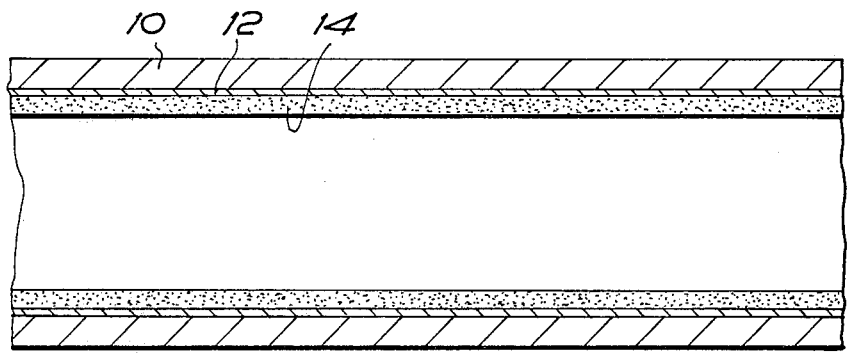
FIG. 2 shows the section of pipeline of FIG. 1 with the initiator and resin applied thereto.
Figure 3:
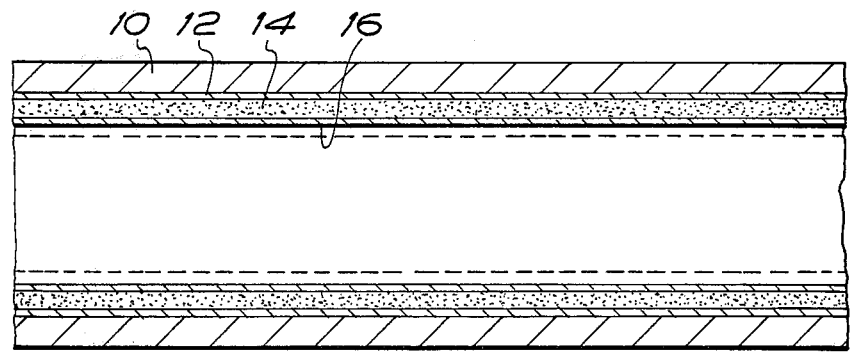
FIG. 3 shows the section of pipeline of FIG. 1 with a further layer of initiator applied.

FIG. 2 shows the pipe section 10 with the initiator 12 applied to the inner surface thereof, and a layer of resin 14 applied on the initiator 12. At the interface between initiator and resin curing of the resin will take place extremely quickly. The entire resin layer will in due course cure throughout its thickness, but to accelerate that cure a further layer of initiator 16 may be applied as indicated in FIG. 3.

Figure 4:
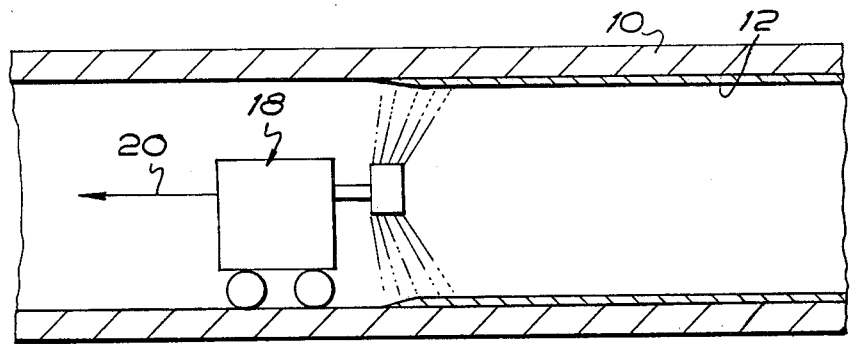
FIGS. 4, 5 and 6 show respectively methods of applying the initiator film or films.
Figure 5:
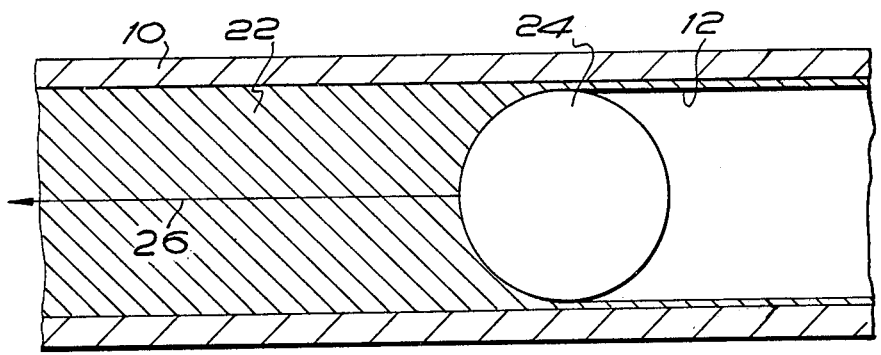
Figure 6:
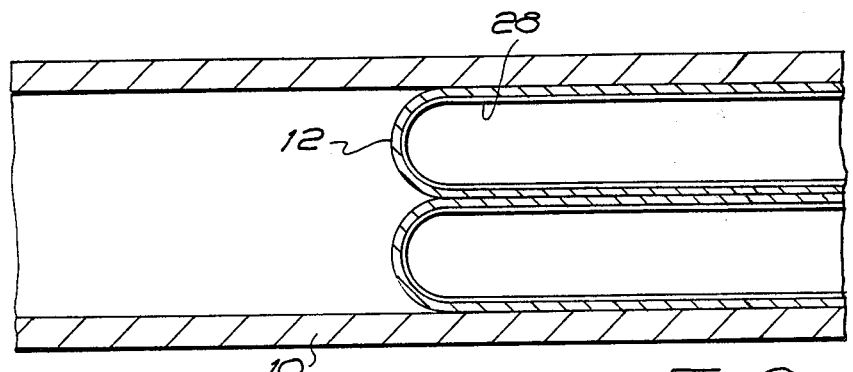

FIGS. 4, 5 and 6 show methods of applying the initiator film 12, and these methods can also be used for applying the resin layers.

In FIG. 4 the section 10 of pipeline is shown as having the initiator layer 12 applied by means of a centrifugal spray apparatus 18 which is pulled along the pipeline as indicated by numeral 20. In FIG. 5, the film 12 is shown as being formed by flooding the pipeline 10 with initiator 22, under pressure, and then by removing excess initiator using a ball 24, or a pig or other device, the ball being pulled through the pipeline 10 as indicated by arrow 26. The ball is slightly less diameter than the inside of the pipeline 10 to leave the film 12 of initiator.

In the arrangement of FIG. 6, a flexible carrier tube 28 has on the inside thereof the initiator film 12 and the tube 28 is everted along the passageway 10 as shown in FIG. 6, so that the inner surface carrying the film of initiator 12 is presented to the inner surface of the pipeline. The carrier sheet subsequently is removed to enable the application of the resin. The resin may be applied by any of the above methods, and in each case there is pressure present which ensures the flowing into cracks and crevices of the initiator film and/or the resin, thereby sealing such cracks or fissures and also sealing leaky joints. In order to effect the method shown in FIG. 6, a fluid pressure differential is used of everting the tube 28 along the pipeline.

The initiator and resin may be applied in as many passes as are desirable, in order to build up the desired thickness of lining on the inside of a pipeline.

As indicated above, an initiator which is acetone based may be used in conjunction with an acrylic type resin, but other two-part resin systems can be used.

When the method illustrated in FIG. 5 is used for forming the initiator film and resin films, when multi-layer arrangements are to be provided, balls or pigs of progressively decreasing diameter will be used. Instead of the ball 24 being pulled through the pipeline, it may be blown or moved through the pipeline by any other means.

The accompanying drawings are given by way of explanation, and are not to scale. Clearly, the thicknesses of the initiator and resin layers will be very small in relation to the entire diameter of the pipeline, the initiator layers being in terms of microns, whilst the resin layers may be of the order of one sixteenth to one eighth of an inch.

Whilst it is desired that the resin system used should be of a type which cures extremely quickly (virtually on contact of the initiator and resin) and should not require the presence of heat to accelerate the cure, it is also within the scope of this invention to use heat for cure acceleration if necessary.

I claim:

1. A method of forming a lining in a pipeline, which method comprises the steps of
   (a) forming on the inner surface of the pipeline a film of initiator,
   (b) depositing on the inner surface of the film of initiator produced in accordance with step (a) a layer of resin whereupon accelerated curing of the resin takes place,
   (c) repeating steps (a) and (b) any desired number of times until a cured lining of the desired thickness has been built up on the interior of the pipeline.

2. A method according to claim 1 wherein each film of initiator is applied by a centrifugal spraying method.

3. A method according to claim 1 wherein each film of initiator is applied by means of a carrier tube which is everted into the pipeline, the initiator being on the inside of the carrier tube prior to eversion so that it is presented to the pipeline surface or the surface of the appropriate resin layer.

4. A method according to claim 1 wherein each film of initiator is applied by filling the pipeline with initiator and then removing excess initiator by displacing it through the pipeline by means of a ball or pig.

5. A method according to any one of claims 1–4, wherein each resin layer is applied by a centrifugal spraying method.

6. A method according to any of claims 1–4 wherein each resin layer is applied by everting the carrier tube into the pipeline, the resin being to the inside of the tube before eversion and to the outside after eversion so that it is presented to the appropriate film of initiator.

7. A method according to any of claims 1–4 wherein each resin layer is applied by filling the pipeline with resin and by removing excess resin by displacing the ball or pig along the pipeline.

* * * * *